US012035145B2

(12) United States Patent
Anchala et al.

(10) Patent No.: US 12,035,145 B2
(45) Date of Patent: Jul. 9, 2024

(54) AUTOMATED SECTOR CREATION IN PHYSICAL RADIOFREQUENCY NETWORK DEPLOYMENTS

(71) Applicant: DISH Wireless L.L.C., Englewood, CO (US)

(72) Inventors: Aravind Anchala, Reston, VA (US); Dilip Tandekar, Broadlands, VA (US); Gurpreet Sohi, Parker, CO (US); Sourabh Gupta, Ashburn, VA (US); Neil Nocete, Fairfax, VA (US)

(73) Assignee: DISH Wireless L.L.C., Littleton, CO (US)

( * ) Notice: Subject to any disclaimer, the term of this patent is extended or adjusted under 35 U.S.C. 154(b) by 382 days.

(21) Appl. No.: 17/546,297

(22) Filed: Dec. 9, 2021

(65) Prior Publication Data

US 2023/0189007 A1 Jun. 15, 2023

(51) Int. Cl.
*H04W 16/14* (2009.01)
(52) U.S. Cl.
CPC .................. *H04W 16/14* (2013.01)
(58) Field of Classification Search
None
See application file for complete search history.

(56) References Cited

U.S. PATENT DOCUMENTS

2016/0095109 A1* 3/2016 Scott ............... H04W 24/08
370/229
2021/0352502 A1* 11/2021 Ginis ............... H04W 24/08

* cited by examiner

*Primary Examiner* — Frantz Bataille
(74) *Attorney, Agent, or Firm* — Kilpatrick Townsend & Stockton LLP

(57) ABSTRACT

Systems and methods are described for automated sector creation in greenfield physical radiofrequency (RF) communication network infrastructures. For example, a network operator is granted licenses to use multiple spectrum blocks in multiple geographic regions for which the network operator does not currently have physical infrastructure. An RF network design defines a number of template antennas located at template site locations to meet a link budget over a target coverage area. For each template site location, embodiments can automatically compute sectors based on the associated template antennas and local spectrum licensing information. The computed sectors can effectively define a physical network deployment, including locations and configurations for sector antennas, by which the network operator can provide a desired quality of coverage to subscribers in the target coverage area.

20 Claims, 7 Drawing Sheets

AUTOMATED SECTOR CREATION IN PHYSICAL RADIOFREQUENCY NETWORK DEPLOYMENTS

FIELD

Embodiments relate in general to physical communication network infrastructures, and, more particularly, to automated sector creation in greenfield physical communication network infrastructures.

BACKGROUND

As telecommunications technologies continue to develop and new related markets continue to emerge, new and old network operators are constantly looking for ways to provide new (e.g., upgraded, expanded, etc.) network service offerings to consumers. In such contexts, network operators can generally be categorized as either "brownfield" or "greenfield" operators. A brownfield network operator typically offers new network services using an existing network infrastructure with legacy components, such as by upgrading or expanding legacy capabilities. In contrast, a greenfield operator typically offers new network services by deploying (e.g., and installing, configuring, etc.) entirely new network infrastructure, at least in relation to the new network service offerings. A same network operator can be both a brownfield and a greenfield operator in different contexts. For example, a network operator can already have an established subscriber base on a legacy network using a first radio technology, and can offer new services as a brownfield operator in that context. The same network provider can then obtain a new swath of spectrum, for which it can develop entirely new network infrastructure, new service offerings, and new subscribers as a greenfield operator.

Developing a new network as a greenfield network operator can involve developing new physical network infrastructure. The greenfield operator may be granted one or more licenses (e.g., by virtue of a spectrum auction conducted by the Federal Communications Commission) to provide services over one or more bands or sub-bands of spectrum in particular geographical regions. Thus, greenfield operators can seek to maximize the license value by designing their new physical infrastructure to maximize network coverage to a maximum number of potential new subscribers within the scope of their licenses. For cellular networks, designing the physical infrastructure includes determining how many physical antennas to deploy in which physical locations to ensure that the resulting radio access network (RAN) will provide the desired coverage and/or other features.

SUMMARY

Embodiments of the present invention relate to automated sector creation in greenfield physical radiofrequency (RF) communication network infrastructures. For example, a network operator is granted licenses to use multiple spectrum blocks in multiple geographic regions for which the network operator does not currently have physical infrastructure. An RF network design defines a number of template antennas (i.e., logical template models of proposed physical antennas) to be located at template site locations to meet a link budget over a target coverage area. For each template site location, embodiments can automatically compute sector deployments based on the associated template antennas and local spectrum licensing information. The computed sector deployments can effectively define a physical network deployment, including locations and configurations for sector antennas, by which the network operator can provide a desired quality of coverage to subscribers in the target coverage area.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Developing a new network as a greenfield network operator can involve developing new physical network infrastructure. The greenfield operator may be granted one or more licenses to provide services over one or more bands or sub-bands of spectrum in particular geographical regions. In seeking to maximize the value of the license grants, greenfield network operators can design their new physical infrastructure to maximize network coverage to a maximum number of potential new subscribers within the scope of their licenses. For cellular networks, designing the physical infrastructure includes determining how many physical antennas to deploy in which physical locations to ensure that the resulting radio access network (RAN) will provide the desired coverage and/or other features.

Figure 1A:
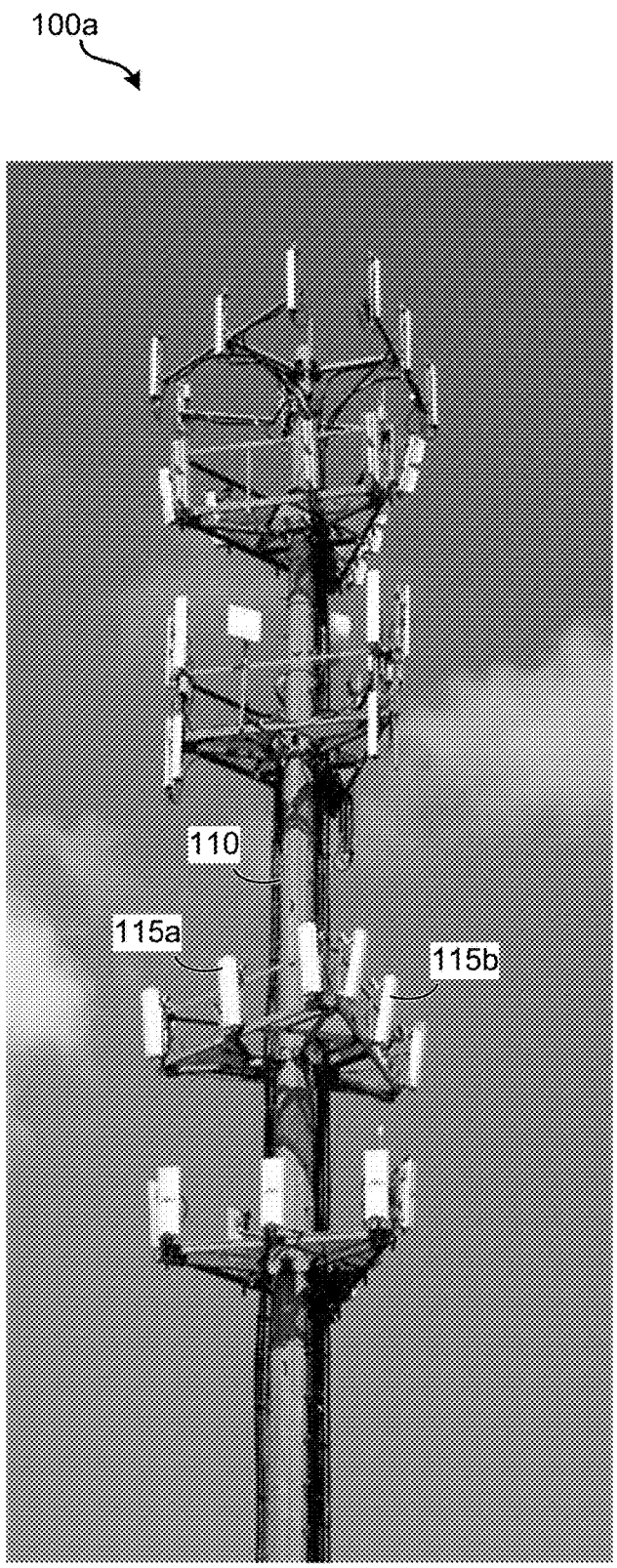
FIGS. 1A and 1B show an example physical deployment site for sector antennas of a radiofrequency (RF) network.
Figure 1B:
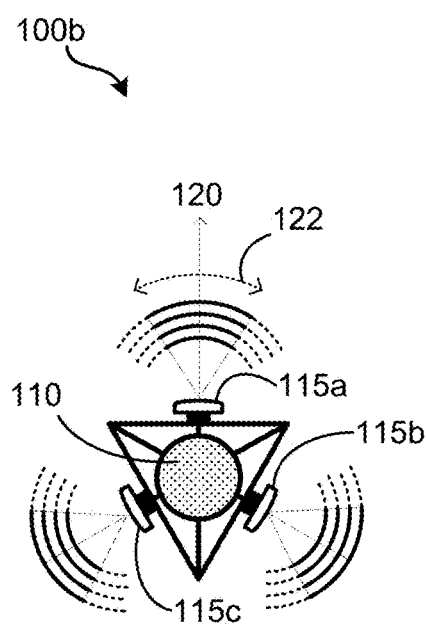

The physical antenna placements involve locating sites with physical structures on which to place the antennas, and configuring a respective set of sector antennas to deploy at each of those sites. For the sake of context, FIGS. 1A and 1B show an example physical deployment site 100 for sector antennas of a radiofrequency (RF) network. As illustrated in FIG. 1A, the site includes a support structure 110 to support multiple sector antennas 115. The support structure 110 is illustrated as a tall pole. In some instances, the support structure 110 is implemented as other types of dedicated, self-supporting structures. In other instances, the support structure 110 is attached to another self-supporting structure, such as a building, water tower, or the like. The support structures 110 of the antenna and radio unit can include any suitable structures that are tall enough to provide desired vertical sector antenna 115 placement, strong and stable enough to support the sector antennas 115 (e.g., including in wind and other weather conditions), etc. The particular support structure 110 shown in FIG. 1A is supporting multiple sector antennas 115 at multiple vertical and radial locations.

Each sector antenna 115 is a radiofrequency (e.g., microwave) antenna having a directional, sector-shaped radiation pattern. Typically, each sector antenna 115 is configured to produce relatively wide horizontal beamwidth and a relatively narrow vertical beamwidth. In this way, the radiation can effectively fan out to cover a large horizontal area, while avoiding interfering with antennas above and below on a same support structure 110. For example, the radiation beam may spread over a horizontal arc of 60-120 degrees, while the vertical beamwidth may only be less than 15 degrees. As can be seen in FIG. 1A, the sector antennas 115 may, in some cases, be tilted downward (e.g., manually, electromechanically, by phase shifting, etc.). Such downward tilting can help constrain the projected radiation pattern of the sector antenna 115 to within a desired boundary to avoid interference.

As illustrated in FIG. 1B, many modern cellular RAN infrastructures use a three-sector deployment (sometimes referred to as a three-sector antenna, a three-sector base station, or the like) at each site (e.g., on each support structure 110). Each sector antenna 115 can be said to be radially pointing in a direction of a primary radiation axis 120, and its radiation generally fans out horizontally to provide the horizontal coverage. Thus, as used herein, creating or computing a "sector" can generally refer to creating or computing a particular horizontal arc (e.g., 120 degrees) of radiation in a particular frequency range; the arc originated at a particular site location and has a centerline that generally points along a primary radiation axis 120. The computed sector can be physically implemented by locating a sector antenna 115 at the site location, pointing it at an azimuth corresponding to, or at an inclination angle to the primary radiation axis 120, and configured it to radiate the particular frequency range in substantially the manner of the corresponding sector.

In the illustrated three-sector antenna deployment, the three sector antennas 115 are pointed for potential maximum coverage, such as at zero degrees, 120 degrees, and 240 degrees. The illustrated sector antennas 115 are shown as having a horizontal beamwidth 122 of approximately 66 degrees. The beamwidth is the angle between the points at which the signal strength is decreased by around 3 decibels (approximately half the signal strength) on either side of a peak signal strength. For example, the illustrated 66-degree horizontal beamwidth 122 indicates a relatively high signal strength within a range of plus or minus 33 degrees from the primary radiation axis 120, and less than half the signal strength outside that arc. The signal strength may continue to fall beyond the beamwidth, until it reaches a relatively negligible level outside some larger arc, such as at more than plus or minus 60 degrees from the primary radiation axis 120. For example, the radiation patterns are represented in FIG. 1B as thicker arcs within a 66-degree beamwidth 122 and as dashed arcs outside the beamwidth 122 and within a larger 120-degree arc. With the sector antennas 115 each radiating over approximately 120 degrees and each radially separated from its neighboring sector antenna 115 by 120 degrees, the three-sector deployment can provide a substantially 360-degree radiation pattern (though not with evenly distributed power across all 360 degrees).

For the sake of clarity herein, descriptions will refer to "sector deployments." Each sector deployment includes a set of sector antennas 115 all co-assigned to a same site (typically at a same height) to transmit on one or more spectrum blocks under a same license (e.g., a same spectrum block, a or contiguous set of spectrum blocks, or a non-contiguous set of spectrum blocks). Each sector antenna 115 in a same sector deployment can have its own respective azimuth (i.e., radial pointing direction). Typically, each sector deployment has three sector antennas 115 pointed in different directions (e.g., to cover 360 degrees). However, some sector deployments can have more or fewer sector antennas 115 to provide a desired radiation profile, to avoid certain interference, etc. Each sector antenna 115 in a same sector deployment can have other characteristics that are the same as, or different from those of the other sector antennas 115 in its sector deployment, such as the same or different radiation pattern, downtilt, power level, etc.

As used herein, sector antennas 115 of a sector deployment are considered "co-assigned to a same site" when commonly assigned to a same geographical location as defined according to a particular latitude and longitude, a particular support structure 110, etc. Sector antennas 115 installed on multiple support structures 110 can be considered as being co-assigned to a same site, even though the support structures 110 may technically be separate structures (e.g., multiple brackets attached to a same large water tower), as long as the structures are intended as (e.g., leased as) a single site. As used herein, sector antennas 115 of a sector deployment are considered "co-assigned to a same site" when they are at a same vertical location, as defined by a vertically positioned sub-structure on a support structure 110, by an altitude relative to sea level, by a vertical distance relative to the ground, etc. Sector antennas 115 in a same sector deployment can still be considered as being "co-assigned to a same height," even though the heights may slightly differ due to manufacturing or installation tolerances, structural limitations, etc.

As used herein, sector antennas 115 of a sector deployment are considered "co-assigned to a same spectrum block" when they are all deployed to transmit on a same particular frequency band division as defined by an associated spectrum license. For example, a recent spectrum auction performed by the Federal Communications Commission (FCC) allowed parties to bid on 280 Megahertz (MHz) of total spectrum in the 3.7-3.98 Gigahertz (GHz) frequency band. A total of 5,684 licenses were auctioned, each for one of 14

"spectrum blocks" (each representing a 20 MHz portion of the 280 MHz) in each of 406 defined geographic regions. In some cases, such auctions also use the term "block" to refer to a larger spectrum division, and the term "sub-block" is used for the smaller spectrum subdivisions. For example, the referenced auction was listed as having an "A-block" with five of the sub-blocks (between 3.7-3.8 GHz), a "B-block" with another five of the sub-blocks (between 3.8-3.9 GHz), and a "C-block" with the remaining four of the sub-blocks (3.9-3.98 GHz). As used herein, the term "spectrum block" intends to refer to the licensed spectrum sub-band in a sector antenna 115 would be configured to radiate, not to the auction subdivisions (e.g., to the 20 MHz spectrum blocks in the example FCC auction).

As noted above, each spectrum license typically allows particular use of a licensed spectrum block within a licensed geographic region. A same network operator licensee may typically be granted multiple licenses (e.g., as part of a same auction), which together allow particular use of a licensed spectrum block within multiple licensed geographic regions, particular use of multiple licensed spectrum blocks within one licensed geographic regions, or particular use of multiple licensed spectrum blocks within multiple licensed geographic regions. For example, a nationwide carrier seeking to build out a new cellular network in a new frequency band may be granted hundreds or thousands of licenses in one or more auctions, permitting the nationwide carrier to offer services in one or more licensed spectrum blocks in each of hundreds or thousands of licensed geographic regions.

FIGS. 1A and 1B illustrate a single support structure 110, which may represent a single site for one or more sector deployments (e.g., at one or more associated heights). Each sector deployment can provide an associated coverage area, which corresponds to a union of all the projected radiation patterns from the sector antennas 115 of the sector deployment. For example, subscribers located within the coverage area of the sector deployment can be serviced by the network operator that operates that sector deployment. To cover a very large geographical region may involve operating very large numbers of such sector deployments located in very large numbers of sites. For example, each individual coverage area may have a radius of only a few miles, and a network operator may deploy hundreds, thousands, or more sector deployments across geographically distributed sites to provide coverage over large portions of a country or region.

For a greenfield network operator, establishing new physical network infrastructure can involve designing a RAN to provide optimal coverage and capacity to maximize the value of their license grants. Thus, for each licensed spectrum block in each licensed geographic region, designing the RF plan involves defining set of sector deployments that will produce desired coverage characteristics. Defining the set of sector deployments for each licensed spectrum block in each licensed geographic region involves a number of complex considerations, such as considering in which parts of the licensed geographic region to provide coverage at which power levels, considering whether those desired coverage areas have geographic features (e.g., terrain) that may impact propagation of radiation in the licensed spectrum block, considering physical locations of available sites in the licensed geographic region (e.g., those having space for additional sector deployments, available for leasing, etc.), etc. Particularly for a greenfield operator obtaining hundreds of license grants, building out a supporting physical network infrastructure can involve analyzing such considerations for defining many thousands of sector deployments.

Figure 2:
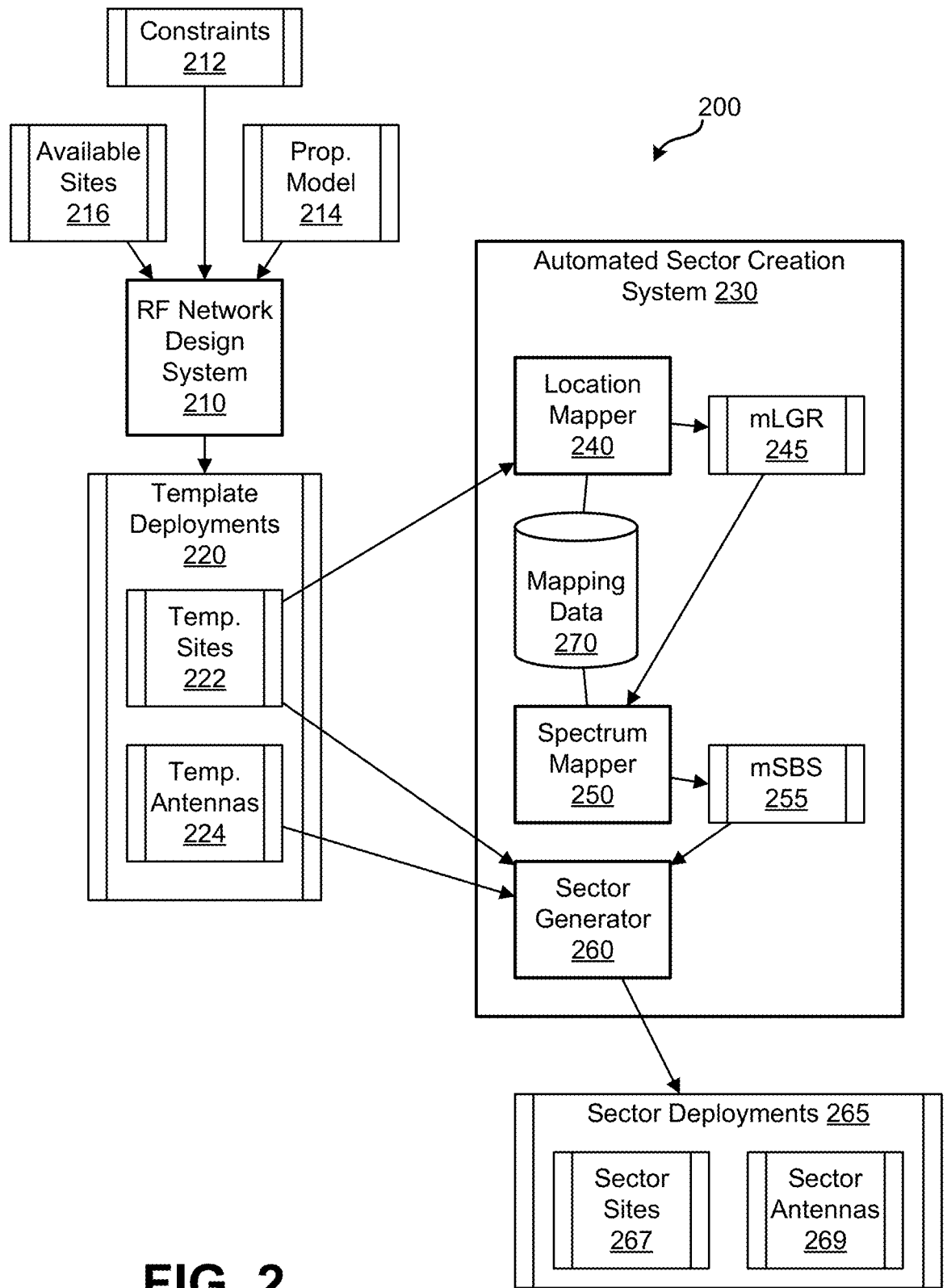
FIG. 2 shows a block diagram of an illustrative RF network design environment in which a greenfield network operator can implement automated sector creation, according to various embodiments described herein.

FIG. 2 shows a block diagram of an illustrative radiofrequency (RF) network design environment 200 in which a greenfield network operator can implement automated sector creation, according to various embodiments described herein. As illustrated, the environment 200 can include a RF network design system 210 and an automated sector creation system 230. In some embodiments, the automated sector creation system 230 is implemented as part of the RF network design system 210. In general, the RF network design system 210 is used to generate a set of template deployments 220, which essentially make up an RF network design that satisfies a link budget for providing RF network coverage to subscribers in a target coverage area. The template deployments 220 define template antennas 224 (with corresponding antenna characteristics) to be deployed at particular template sites 222 throughout the target coverage area. Embodiments of the automated sector creation system 230 generally use those template deployments 220, along with mapping data 270 relating to licensed geographic regions and licensed spectrum blocks, to compute sector deployments 265. The sector deployments 265 define the locations and characteristics of all the sector antennas to be deployed by a greenfield network operator as new physical RAN infrastructure for providing subscriber coverage across the target coverage area.

Figure 3:
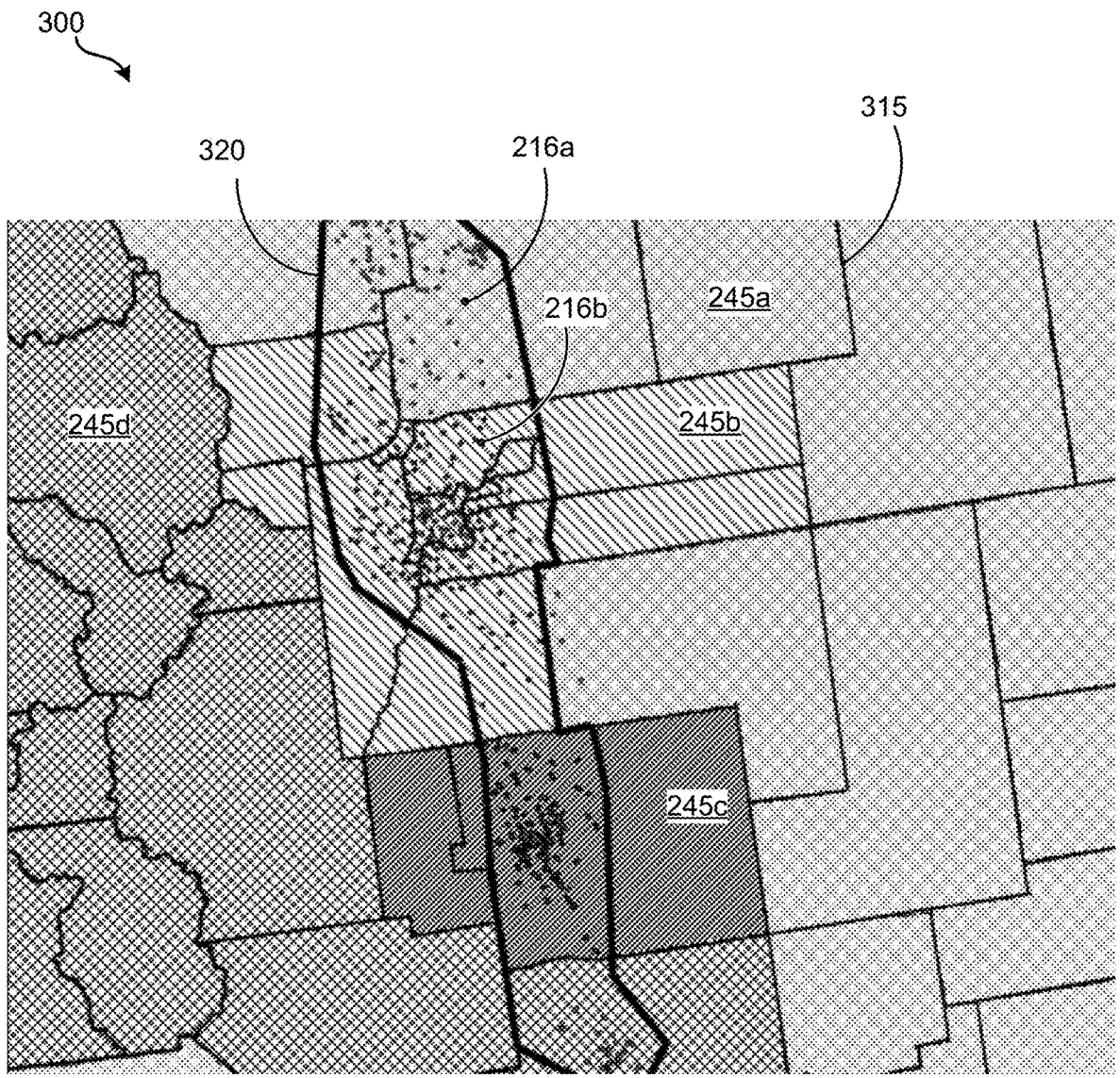
FIG. 3 shows an illustrative geographic context for a greenfield physical network deployment.

For the sake of added context, the description of FIG. 2 will continue along with reference to FIG. 3. FIG. 3 shows an illustrative geographic context 300 for a greenfield physical network deployment. The illustrative geographic context 300 assumes that the greenfield network operator is seeking to provide coverage to customers within a target coverage area 320 (identified by a dark boundary). To provide such coverage, the greenfield network operator can build out a new physical network infrastructure, including designing a radiofrequency (RF) network (e.g., a RAN) to have desired radiation characteristics over the target coverage area 320. It is assumed that the greenfield network operator has been granted various spectrum licenses, such that the greenfield network operator is permitted to use a set of one or more licensed spectrum blocks in each of multiple licensed geographic regions that overlap with the target coverage area 320 in order to implement the designed RF network.

During an initial RF network design phase, the greenfield network operator can determine all available sites 216 (i.e., cell sites) in the target coverage area 320. Within the target coverage area 320, all available sites 216 are shown as dots, each representing one or more collocated physical support structures on which a sector deployment can be installed, as described above. For example, the greenfield network operator can contact multiple site (e.g., cell tower) vendors in the region to obtain a list of all available sites 216 in the target coverage area 320. Each available site 216 can be associated with a respective physical site location (e.g., defined by latitude and longitude, or in any other suitable manner). In some cases, some or all available sites 216 can be associated with additional information, where available and/or relevant, such as one or more available antenna heights at which a sector deployment at that site could be installed, available types of support structures (e.g., whether an associated structure supports certain amounts of downtilt), nearby physical obstructions, etc.

As illustrated in FIG. 2, the set of available sites 216 can be an input to the RF network design system 210. In some embodiments, the RF network design system 210 is implemented as a computational tool to assist RF network designers with generating a detailed RF network design. The RF network design can seek to ensure that receivers (e.g., subscriber devices) across the target coverage area 320 will see at least a minimum signal quality (e.g., quality of service, signal to noise ratio, etc.) when accounting for all gains and losses impacting radiation to and from all the sector antennas that are part of the RF network design. Such a target can be expressed as one or more link budgets across the target coverage area 320. For example, in a cellular network, the link budget can be the amount of power received by a receiver at any particular location computed as a function of transmitting output power of one or more sector antennas impacting that location, plus any gains (e.g., transmitting and/or receiving antenna gains), minus any losses (e.g., transmitting and/or receiving antenna losses, connector and/or other component losses, free space path and/or other path losses, fading margin and/or other attenuations, etc.), plus any added margins (e.g., to account for random variations in channel gain, weather, etc.). In effect, meeting the link budget in a particular location suggests that subscribers in that location will be able to receive at least a certain quality of telecommunication services (e.g., with at least a desired minimum signal-to-noise ratio).

As illustrated, in addition to the set of available sites 216, the RF network design system 210 can take as inputs a set of constraint data 212 and a set of propagation model data 214. The set of constraint data 212 can include at least the link budget. In some cases, the set of constraint data 212 can also include information, such as power constraints associated with the granted spectrum licenses, a template RF frequency (described below), etc. The set of propagation model data 214 can include information about features of the target coverage area 320 that may impact propagation of radiation in the RF network that is being designed. In some cases, regions of the target coverage area 320 can be classified according to geographic and/or other features, referred to herein as geographic morphology. For example, the geographic morphology of a particular target coverage area 320 can include regions classified as sea water, inland water, wetlands, barren land, low vegetation, coniferous forest, deciduous forest, relatively low-height low-density construction (e.g., a village), relatively low-height high-density construction (e.g., a suburban residential area), relatively high-height high-density construction (e.g., a city), a commercial center, an industrial center, an educational campus, an event venue, an airport runway, an airport terminal, etc.

Some RF network designs can account for such region classifications in the set of propagation model data 214 by applying them to one or more radiation propagation models for the target coverage area 320. For example, RF signals can have different propagation characteristics when transmitted through open space, as compared to being transmitted through a forest, a dense city, etc. Different modeled impacts of the classifications on propagation of RF signals in different regions of the target coverage area 320 can be used to guide placement and/or characteristics of transmitters (e.g., power level, azimuth, tilt, height, etc.). In some cases, RF network designs can consider variations in likely subscriber density over the target coverage area 320 based on the same, or other regional classifications. For example, subscriber density is likely to be very low (or non-existent) in a sea water region, but very high in a dense urban region. Such various in density may impact the number of cells servicing particular regions, the amount of power used to transmit there, and/or other factors of the RF network design.

It can generally be assumed that the greenfield network operator is designing the new physical network infrastructure to provide a new infrastructure-class of service offerings. As used herein, a "new infrastructure-class of service offerings" refers to use of new offerings of a network operator that involve a new radio technology, new spectrum bands, and/or any other departure from the network operator's existing infrastructure that necessitates deployment of the new physical infrastructure being designed by the RF network design. For example, a network operator may already have a large physical infrastructure to provide subscriber coverage according to "4G" radio technologies, and the same network operator now desires to offer services to subscribers according to "5G" radio technologies (e.g., 4G an 5G refer, respectively, to so-called "fourth generation" and "fifth generation" standards promulgated by standards setting organizations, such as under the umbrella of the Third Generation Partnership Project (3GPP), and to related technologies conforming to and supporting those standards). The RF network design is generated based on the associated radio technology to the extent that the particular technology impacts the propagation models, and the like. For example, each new infrastructure-class of service offerings may have its own associated types of antennas with their own associated antenna models (e.g., radiation characteristics), its own set of frequency bands (e.g., for uplink and/or downlink), its own power requirements (e.g., transmit power limitations), etc. As such, the RF network design can account for these characteristics in determining placement and/or other characteristics of antennas throughout the target coverage area 320.

Each new infrastructure-class of service offering has an associated set of RF frequencies, and the propagation and/or other characteristics of the antennas can be a function of those RF frequencies. However, the RF network design typically evaluates link budget based on a single template RF frequency that falls within the set of RF frequencies associated with the new infrastructure-class of service offering. For example, the greenfield network operator is designing for new infrastructure-class of service offerings using 5G new radio (NR) technologies. In relation to the 5G NR offerings, the greenfield network operator has been granted a large number licenses to licensed spectrum blocks in a number of different frequency bands, including in the so-called "n29" band (associated with a 700 MHz carrier) and "n71" band (associated with a 600 MHz carrier). During the RF network design phase, link budgets can be computed using any selected template RF frequency in or around these bands, such as using 700 MHz.

Based on the above, the output of the RF network design system 210 (e.g., of an initial RF network design phase) can include a set of template deployments 220 having assigned template sites 222 throughout the target coverage area 320 to meet the link budget. For each template deployment 220, the RF network design can include a set of template antennas 224, each with associated antenna characteristics to include some or all of an antenna height, antenna azimuth, antenna model, downtilt, and power level. Each template antenna 224 is essentially a logical representation of a template for a sector antenna to potentially be deployed as part of the physical network infrastructure. The logical representation can be stored and managed in any suitable manner. For example, each template antenna 224 can be associated with a logical identifier that is associated with all the various antenna characteristic data (e.g., as object data, or the like). In some cases, each template antenna 224 is also associated with the template RF frequency. For example, suppose the initial set of available sites 216 included 5,000 sites geographically distributed across the target coverage area 320. The output of the RF network design phase may be a subset of five hundred template deployments 220 at five hundred respective assigned template sites 222, each corresponding to a respective one of the 5,000 available sites 216.

Embodiments of the automated sector creation system 230 compute sector deployments 265 based on the template deployments 220 and mapping data 270 generated according to spectrum license information. As illustrated, the automated sector creation system 230 can include a location mapper 240, a spectrum mapper 250, and a sector generator 260. As noted above, it is generally assumed that the greenfield network operator is designing the new physical network infrastructure to provide a new infrastructure-class of service offerings in order to utilize spectrum blocks for which the network operator has been granted licenses under multiple geographic spectrum licenses. Thus, for each template deployment 220 in the target coverage area 320, the automated sector creation system 230 first seeks automatically to determine which spectrum blocks the network operator has been licensed to use in the particular physical location corresponding to the template site 222 of the template deployment 220. To that end, for each template deployment 220, the location mapper 240 associates the template site 222 with a mapped licensed geographic region (mLGR) 245 that is mapped to one or more geographic regions identified by the geographic spectrum licenses, and the spectrum mapper 250 determines a mapped spectrum block set (mSBS) 255 indicating which spectrum blocks are licensed to the network operator in the associated mLGR 245.

The association by the location mapper 240 between the template site 222 and the mapped licensed geographic region (mLGR) 245 can be based on mapping data 270 (e.g., maintained in a database, or any suitable data storage). Each mLGR 245 can define a geographic region at least partially encompassing one or more licensing regions of the geographic spectrum licenses. For example, RF spectrum is typically licensed by a regulatory agency (e.g., the FCC) in a manner that authorizes the licensee to communicate within the licensed spectrum block over a particular geographical region defined by the license and within particular other limits defined by the license (e.g., a defined maximum transmission power). The manner of defining a particular geographic region can change from one license to the next, even for different licenses that may impact the same spectrum blocks. For example, each FCC auction typically grants licenses to spectrum blocks based on defined "geographic licensing schemes" Such geographic licensing schemes can define geographic boundaries for a spectrum block license using any of Bureau of Economic Analysis Economic Areas (BEAs), Partial Economic Areas (PEA), Cellular Market Areas (CMA), FCC United States County equivalents, Component Economic Areas (CEA), and/or other geographic designators. As such, any particular site location (e.g., at any particular latitude and longitude) may be geographically located within multiple overlapping geographical designations impacted by multiple overlapping geographic licensing schemes.

The mLGRs 245 can be defined in any suitable manner. For example, each mLGR 245 can be defined as a set of latitude and longitude coordinates that indicate boundary lines of the mLGR. Further, the mLGR 245 definitions may or may not equate to any other geographic licensing schemes, or the like. In one implementation, each mLGR 245 corresponds to a FCC United States County equivalents. For example, a greenfield network operator is granted a set of spectrum licenses that define some licensed geographical boundaries in terms BEAs, and others in terms of PEAs; and the mapping data 270 maps the different boundaries from the different geographic licensing schemes into a normalized set of mLGRs 245 (e.g., each corresponding to a single respective FCC United States County equivalent).

In accordance with the granted spectrum licenses, the greenfield network operator is licensed to use a particular set of spectrum blocks in each mLGR 245. For example, embodiments can ensure that each mLGR 245 is defined to be smaller than geographic licensing schemes being used by the spectrum licenses, so that the set of spectrum blocks licensed to the greenfield network operator is consistent across each defined mLGR 245. For each template deployment 220, the template site 222 has been associated with a particular mLGR 245, and the particular mLGR 245 is associated (by the spectrum license grants) with a particular set of licensed spectrum blocks. Embodiments of the spectrum mapper 250 can thus associate each template site 222 with the set of licensed spectrum blocks for its associated mLGR 245, which is the one or more mSBSs 255 for the template site 222.

For the sake of illustration, suppose the greenfield network operator is granted licensed in the "n71" (600 MHz) band for 5G NR networks. The n71 band includes uplink frequencies in the range of 663-698 MHz, and downlink frequencies in the range of 617-652 MHz. The following Table illustrates some of the possible mSBSs 255 that may be available for the n71 band:

| mSBS 255 ID | Downlink Center (MHz) | Uplink Center (MHz) | Bandwidth (MHz) |
|---|---|---|---|
| A | 619.5 | 665.5 | 5 |
| B | 624.5 | 670.5 | 5 |
| C | 629.5 | 675.5 | 5 |
| D | 634.5 | 680.5 | 5 |
| E | 639.5 | 685.5 | 5 |
| F | 644.5 | 690.5 | 5 |
| G | 649.5 | 695.5 | 5 |
| A-B | 622 | 668 | 10 |
| C-D-E | 634.5 | 680.5 | 15 |
| D-E | 637 | 683 | 10 |
| D-E-F-G | 642 | 688 | 20 |
| E-F-G | 644.5 | 690.5 | 15 |
| F-G | 647 | 683 | 10 |

Each mSBS 255 is a set of spectrum blocks to be supported by a single deployed sector antenna. Some mSBSs 255 correspond only to a single one of the spectrum blocks licensed to the greenfield network operator in the associated mLGR 245. For example, each of the first seven mSBSs 255 listed in the Table represents a respective single 5 MHz block of full-duplex spectrum (5 MHz of downlink spectrum and 5 MHz of uplink spectrum) evenly spaced across the full spectrum range of the n71 band. Other mSBSs 255 correspond to a continuous group (subset) of the spectrum blocks licensed to the greenfield network operator in the associated mLGR 245. Typically, all sector antennas are implemented as multiband antennas, and filters and/or other components are used to limit each deployed sector antenna to radiate in a particular mSBS 255 (i.e., in a single spectrum block, or a contiguous group of spectrum blocks). For example, the mSBS 255 identified as "A-B" represents an instance where both the "A" and "B" mSBSs 255 are licensed to the greenfield network operator in the same mLGR 245, such that a single sector antenna in a physical location within that mLGR 245 can transmit over the entire 10 MHz bandwidth covered by both the "A" and "B" mSBSs 255. The single sector antenna typically treats the contiguous group of "A" and "B" spectrum blocks as a single, combined, 10 MHz "AB" spectrum block. As another example, the mSBS 255 identified as "D-E-F-G" represents an instance where all of the "D", "E", "F", and "G" mSBSs 255 are licensed to the greenfield network operator in the same mLGR 245, such that a single sector antenna in a physical location within that mLGR 245 can transmit over the entire 20 MHz bandwidth covered by all four of the "D", "E", "F", and "G" mSBSs 255. It can be seen that the various mSBSs 255 listed in the Table are all either a single spectrum block or a contiguous group of spectrum blocks.

Typically, a single mSBS 255 does not include a non-contiguous set of the spectrum blocks licensed to the greenfield network operator in the associated mLGR 245, and it is generally assumed that intermediary frequencies (i.e., between the non-contiguous bands) are licensed to another operator. For example, if a particular greenfield network operator has licenses to the "A" and "C" mSBSs 255 in a particular mLGR 245, it can be assumed that another operator has a license to use the "B" mSBS 255 in that same mLGR 245 (or that there is some other reason why the greenfield network operator is not authorized to communicate on the "B" mSBS 255). In such cases, the non-contiguous spectrum blocks are considered as separate mSBSs 255, and the greenfield network operator can deploy a separate sector antenna for each mSBS 255. For example, if the greenfield network operator is granted licenses in a particular mLGR 245 to use spectrum blocks "D", "E", and "G" in a particular mLGR 245, the spectrum mapper 250 can assign two mSBSs 255 to any template site 222 in that mLGR 245: a first mSBS 255 corresponding to the 10 MHz contiguous "D-E" frequencies; and a second mSBS 255 corresponding to the 5 MHz "G" frequencies.

Notably, the Table above only shows some of the possible mSBSs 255 for a single 5G NR band. In a large-scale greenfield network deployment, the same greenfield network operator may be granted licenses for spectrum blocks in multiple such bands. For example, to build out a certain type of 5G NR network, a greenfield network operator may be granted licenses in n29, n66, n70, n71, and/or others. As such, the non-contiguous spectrum blocks licensed to a particular greenfield network operator in a particular mLGR 245 may be from different bands. As such, for a particular template site 222, the spectrum mapper 250 may associate the one or more mSBSs 255 as one or more mSBSs 255 in each of one or more bands.

For further illustration, FIG. 3 shows illustrative mLGRs 245 as bounded by thinner boundary lines 315. For example, each boundary line 315 may also coincide with a U.S. county boundary, or the like. The shading pattern in each mLGR 245 represents the set of mSBSs 255 for that mLGR 245 (i.e., all mLGRs 245 with the same shading are also associated with the same set of mSBSs 255). For example, mLGR 245a and a number of other adjacent mLGRs 245 are shaded according to a first shading pattern, corresponding to a first one or more mSBSs 255 (e.g., n71 spectrum block "A"); mLGR 245b and a number of other adjacent mLGRs 245 are shaded according to a second shading pattern, corresponding to a second one or more mSBSs 255 (e.g., n71 spectrum block "FG"); mLGR 245c and a number of other adjacent mLGRs 245 are shaded according to a third shading pattern, corresponding to a third one or more mSBSs 255 (e.g., n71 spectrum block "F" and two spectrum blocks from n66); and mLGR 245d and a number of other adjacent mLGRs 245 are shaded according to a fourth shading pattern, corresponding to a fourth one or more mSBSs 255 (e.g., n71 spectrum block "G", one spectrum block from n66, and two spectrum blocks from n29).

Returning to FIG. 2, embodiments of the sector generator 260 compute a sector deployment 265 for each mSBS 255 at each template deployment 220 (i.e., at each template site 222). Each computed sector deployment 265 defines a set of sector antennas 269 for installation at a sector site 267 corresponding to the template site 222 defined by the template deployment 220. Each of the set of sector antennas 269 is configured to operate in accordance with the mSBS 255 and with antenna characteristics of the template antennas 224 defined by the template deployment 220. In some embodiments, each computed sector antenna 269 corresponds to one of the template antennas 224 and can be automatically populated with antenna characteristics, accordingly. For example, each sector antenna 269 can inherit characteristics, such as antenna model, height, azimuth, downtilt, transmit power, etc. from its corresponding template antenna 224.

As used herein, the "sector antennas 269" computed as part of the computed sector deployments 265 are logical representations of proposed physical sector antennas. From the perspective of the sector generator 260, each sector antenna 269 can be identified by a cell identifier (or any suitable logical identifier), and the cell identifier is logically associated in any suitable manner with antenna characteristics data. In one implementation, each sector generator 260 is stored as an object identified by the cell identifier, and the antenna characteristics are stored as object data, metadata, or the like. In another implementation, the cell identifiers and antenna characteristics are stored in a relational database, or otherwise as structured data.

The sector site 267 of each sector deployment 265 is necessarily within a single mLGR 245 and is generated according the one or more mSBSs 255 for that mLGR 245. Each sector deployment 265 is generated for a single mSBS 255. As such, for any template site 222 located in a mLGR 245 that has multiple mSBSs 255, the sector generator 260 will generate a unique sector deployment 265 at the same corresponding sector site 267 for each mSBS 255 in that mLGR 245. For example, if a particular template site 222 is located in a mLGR 245 that has four mSBSs 255 (e.g., corresponding to four non-contiguous sets of spectrum blocks), the sector generator 260 will generate four separate sector deployments 265; each having a respective set of sector antennas 269 located at the same sector site 267, but configured with antenna characteristics associated with the particular spectrum blocks of its respective one of the four mSBSs 255.

In some embodiments, each sector deployment 265 automatically generates the set of sector antennas 269 as a set of three sector antennas 269, such as illustrated in FIG. 1B. For the set of three sector antennas 269, all three sector antennas 269 are at the same sector site 267 at a same antenna height, and each has a different respective antenna azimuth. As described above, the respective antenna azimuths can be approximately 120 degrees apart, such that there is maximum directional separation between the beams. For any template site 222 located in a mLGR 245 that has multiple mSBSs 255, such embodiments of the sector generator 260 will generate a unique sector deployment 265 of three dedicated sector antennas 269 at the same corresponding sector site 267 for each mSBS 255 in that mLGR 245. For example, each set of three sector antennas 269 can be assigned to its own respective antenna height on the support structure at the sector site 267.

In some embodiments, the sector generator 260 automatically generates sector deployments 265 for all template sites 222. In other embodiments, the sector generator 260 automatically generates sector deployments 265 for all template sites 222 within a defined target coverage area 320. For example, a target coverage area can be manually drawn on a mapping interface of an application, defined by coordinates, and/or indicated in any other suitable manner. In other embodiments, the sector generator 260 automatically generates sector deployments 265 for all template sites 222 that are selected. For example, each template site 222 can be selected in a graphical mapping interface (e.g., such as illustrated in FIG. 3), selected from a list of template sites 222, selected by coordinates, and/or selected in any other suitable manner.

Figure 4:
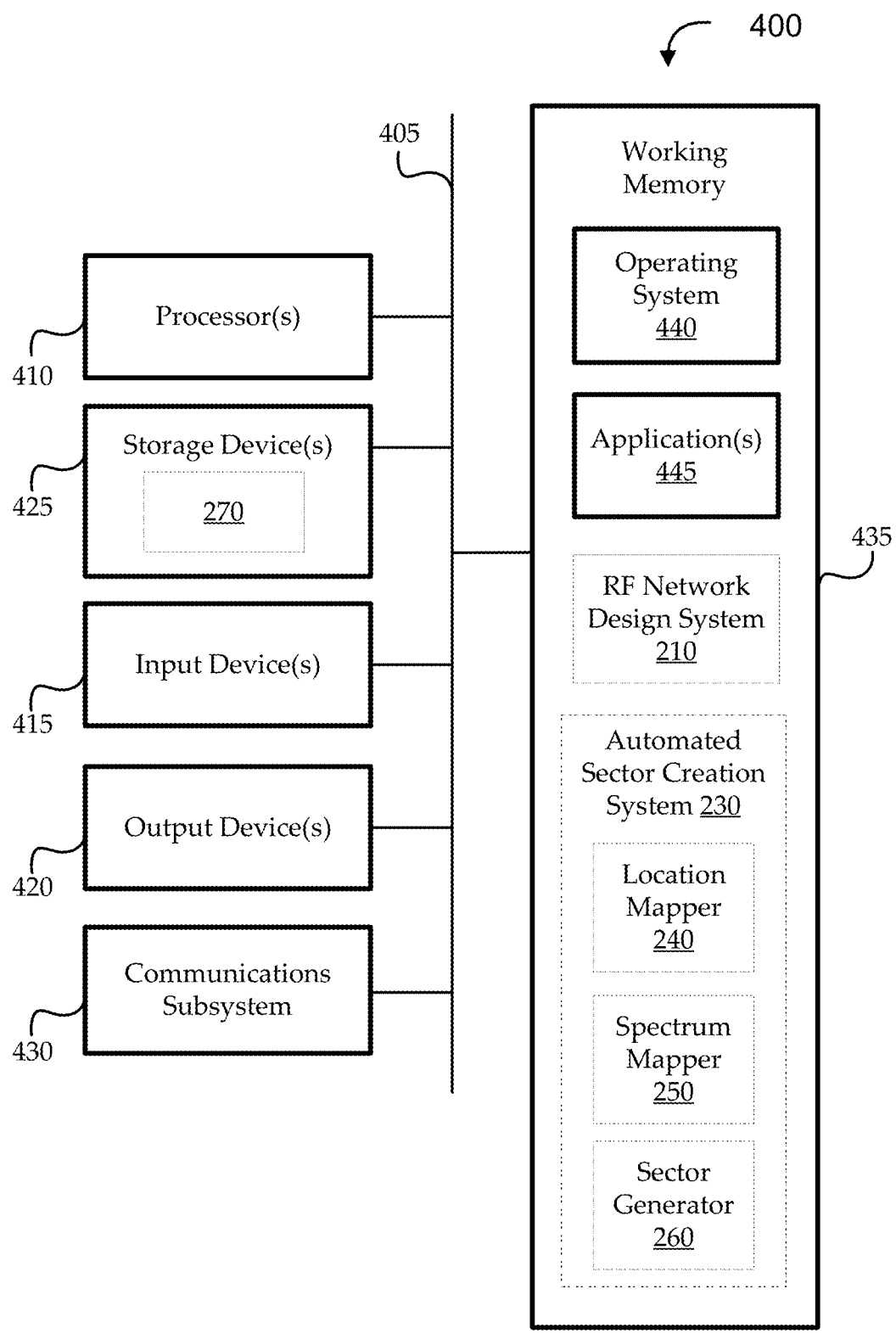
FIG. 4 provides a schematic illustration of one embodiment of a computer system that can implement various system components and/or perform various steps of methods provided by various embodiments.

In some embodiments, components of the automated sector creation system 230 (e.g., and the RF network design system 210 can be implemented in a computational environment. FIG. 4 provides a schematic illustration of one embodiment of a computer system 400 that can implement various system components and/or perform various steps of methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, touchscreen interfaces, audio interfaces, video interfaces, and/or the like; and one or more output devices 420, which can include, without limitation, display devices, printers, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 425 include memory for storing the mapping data 270, and/or other data used by embodiments. The computer system 400 can also include a communications subsystem 430, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like.

In many embodiments, the computer system 400 will further include a working memory 435, which can include a RAM or ROM device, as described herein. The computer system 400 also can include software elements, shown as currently being located within the working memory 435, including an operating system 440, device drivers, executable libraries, and/or other code, such as one or more application programs 445, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the operating system 440 and the working memory 435 are used in conjunction with the one or more processors 410 to implement some or all of the automated sector creation system 230. For example, the operating system 440 and the working memory 435 are used in conjunction with the one or more processors 410 to implement some or all of the location mapper 240, the spectrum mapper 250, and the sector generator 260.

A set of these instructions and/or codes can be stored on a non-transitory (or non-transient) computer-readable storage medium, such as the non-transitory storage device(s) 425 described above. In some cases, the storage medium can be incorporated within a computer system, such as computer system 400. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 400 and/or can take the form of source and/or installable code, which, upon compilation and/or installation on the computer system 400 (e.g., using any of a variety of generally available compilers, installation programs, compression/decompression utilities, etc.), then takes the form of executable code.

In some embodiments, the computational system 400 implements a system for automated sector creation, as described herein. The non-transitory storage device(s) 425 can have instructions stored thereon, which, when executed, cause the processor(s) 410 to assign a mapped licensed geographic region (mLGR) to each template deployment of multiple template deployments based on a template site defined by the template deployment to correspond to one of multiple cell sites in a target coverage area of a radiofrequency (RF) network to be deployed by a network operator for use of spectrum blocks licensed to the network operator under geographic spectrum licenses. Each template deployment defines a set of template antennas at the template site, and the mLGR is one of multiple mLGRs that each defines a geographic region at least partially encompassing one or more licensing regions of the one or more geographic spectrum licenses. The instructions can further cause the processor(s) 410 to assign, to each template deployment, at least one mapped spectrum block set (mSBS) based on the mLGR and the one or more geographic spectrum licenses. The instructions can further cause the processor(s) 410 to compute, for each mSBS at each template deployment, a sector deployment that defines a set of sector antennas for installation at the template site defined by the template deployment, such that each of the set of sector antennas operates in accordance with the mSBS and with antenna characteristics of the template antennas defined by the template deployment. In some embodiments, the non-transitory storage device(s) 425 can have, stored thereon, mLGR definitions to define respective geographical boundaries for each mLGR. In such embodiments, for each template deployment, the assigning the mLGR can include locating the template site as within the respective geographical boundaries of an identified one of the mLGRs, and assigning the mLGR for the template deployment as the identified one of the mLGRs. In some embodiments, the non-transitory storage device(s) 425 further have mappings stored thereon that identify, based on the geographic spectrum licenses, which of the spectrum blocks is licensed to the network operator in each of the mLGRs. Such embodiments, for each template deployment, can assign the at least one mSBS based on the mappings.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which can be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 can cause the processor (s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media can be involved in providing instructions/code to processor(s) 410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a disk of a remote computer. The remote computer can load the instructions into its dynamic memory and send the instructions as signals over a transmission medium to be received and/or executed by the computer system 400. The communications subsystem 430 (and/or components thereof) generally will receive signals, and the bus 405 then can carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

Some embodiments of the automated sector creation system 230 include an application interface, such as for display in the computational environment of FIG. 4, or any other computational environment in communication therewith. The application interface provides users with access to features of the automated sector creation system 230, such as permitting users to instruct the automated sector creation system 230 to automatically generate sector deployments 265 at template sites 222 and to view details of generated sector deployments 265. The application interface can include any suitable graphical user interface elements, such as menus, navigational controls, etc.

Figure 5A:
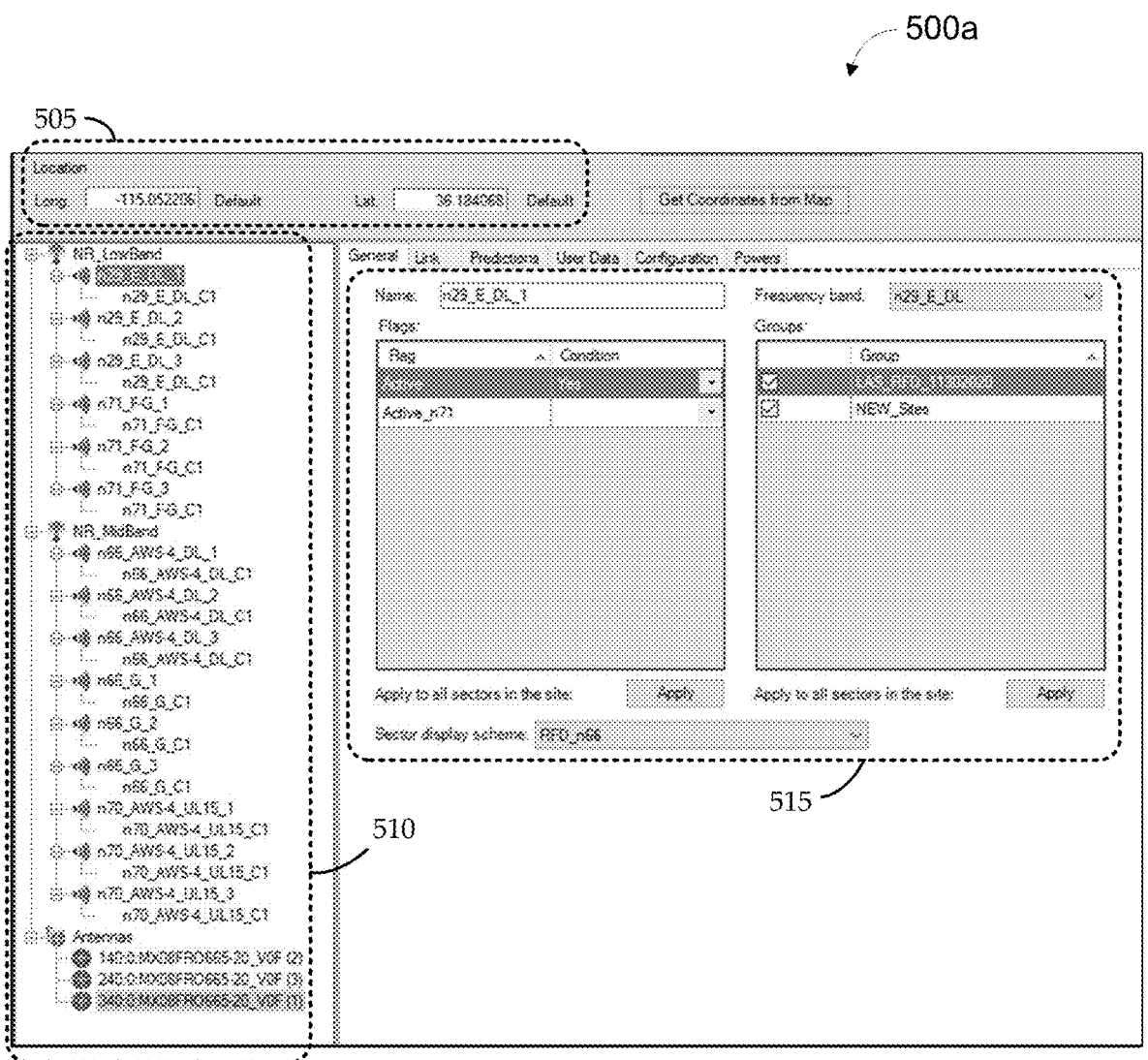
FIGS. 5A and 5B show some examples of illustrative application interface components to illustrate certain features.
Figure 5B:
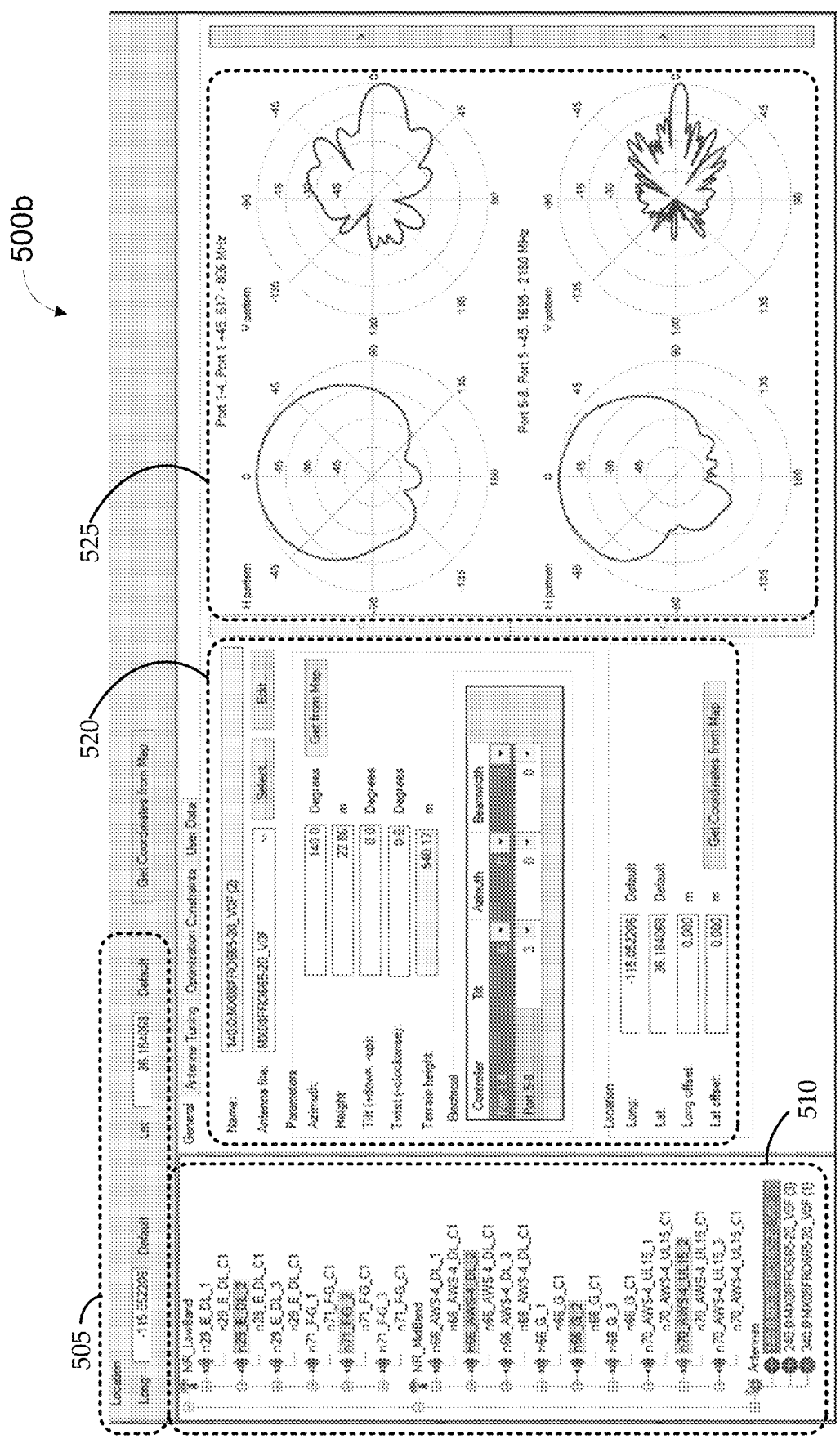

FIGS. 5A and 5B show some examples of illustrative application interface components 500 to illustrate certain features. The application interface component 500a of FIG. 5A shows an example interface screen by which to instruct automated creation of sectors. A location of a template site 222 is indicated in region 505 by latitude and longitude values. A list of existing sectors is shown in region 510. Region 515 illustrates interface elements for creating new sectors in the n29 "E" downlink band based on various template parameters. The application interface component 500b of FIG. 5B shows another example interface screen by which to view characteristics of created sectors. As in FIG. 5A, site location information (now of a sector site 267 of a generated sector antenna 269) is indicated in region 505, and a list of existing sectors is shown in region 510. Region 520 lists certain antenna characteristics associated with the sector antenna 269, such as azimuth, height, downtilt, etc. Region 525 illustrates antenna models that show horizontal and vertical radiation patterns.

Figure 6:
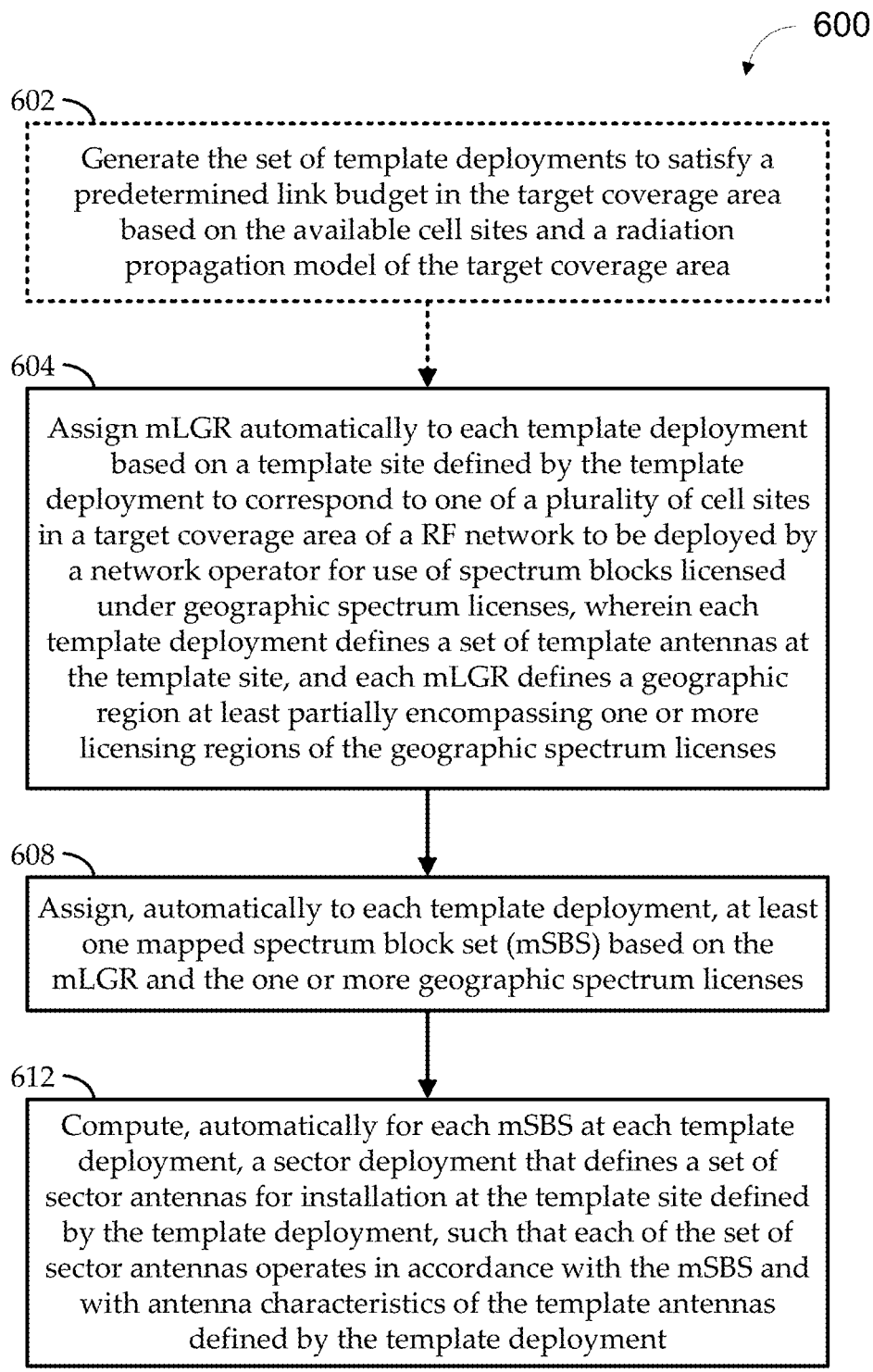
FIG. 6 shows a flow diagram of an illustrative method for automated sector creation, according to various embodiments.

Systems including those described above can be used to implement various methods. FIG. 6 shows a flow diagram of an illustrative method 600 for automated sector creation, according to various embodiments. Embodiments of the method 600 begin at stage 604 by assigning a mapped licensed geographic region (mLGR) automatically to each template deployment of multiple template deployments based on a template site defined by the template deployment. Each template site can correspond to one of multiple cell sites in a target coverage area of a radiofrequency (RF) network. Some embodiments begin at stage 602, prior to stage 604, by generating the set of template deployments to satisfy a predetermined link budget in the target coverage area based on the plurality of available cell sites and a radiation propagation model of the target coverage area.

The RF network is being deployed by a greenfield network operator for use of spectrum blocks licensed to the network operator under geographic spectrum licenses. Each template deployment can define a set of template antennas at the template site, and the mLGR can be one of multiple mLGRs that each at least partially encompasses one or more licensing regions of the geographic spectrum licenses. In some embodiments, each mLGR is associated with one of a stored number of mLGR definitions that defines respective geographical boundaries for the mLGR. In such embodiments, for each template deployment, the assigning the mLGR at stage 604 can include locating the template site as within respective geographical boundaries of an identified one of the mLGRs, and assigning the mLGR for the template deployment as the identified one of the mLGRs. In some cases, the licensing regions can include multiple of: a Bureau of Economic Analysis Economic Area (BEA), a Partial Economic Area (PEA), a Cellular Market Area (CMA), or a Federal Communications Commission (FCC) United States County equivalent, or a Component Economic Area (CEA). Still, embodiments can map the licensing regions to the mLGRs, such that each template site has a physical location corresponding to only one of the mLGRs.

At stage 608, embodiments can assign, automatically to each template deployment, at least one mapped spectrum block set (mSBS) based on the mLGR and the geographic spectrum licenses. In some embodiments, for each template deployment, the assigning at stage 608 is based on mappings that identify, based on the geographic spectrum licenses, which of the spectrum blocks is licensed to the network operator in each of the plurality of mLGRs. Each mSBS can corresponds either to one of the spectrum blocks licensed to the network operator under the geographic spectrum licenses, or to a contiguous subset of the spectrum blocks licensed to the network operator under the geographic spectrum licenses.

At stage 612, embodiments can compute, automatically for each mSBS at each template deployment, a sector deployment that defines a set of sector antennas for installation at the template site defined by the template deployment. The computing at stage 612 can be, such that each of the set of sector antennas operates in accordance with the mSBS and with antenna characteristics of the template antennas defined by the template deployment. In some embodiments, the computing at stage 612 is, such that each template deployment defines its set of sector antennas to have: a first sector antenna defined to have an antenna height and a first antenna azimuth; a second sector antenna defined to have the antenna height and a second antenna azimuth that is approximately 120 degrees removed from the first antenna azimuth; and a third sector antenna defined to have the antenna height and a third antenna azimuth that is approximately 240 degrees removed from the first antenna azimuth (i.e., the angular measurements are noted as "approximate" to indicate that the separation may not be precisely 120 degrees due to installation tolerance, practical structural concerns, etc.). In some embodiments, each sector antenna is defined with a set of antenna characteristics based on those of a corresponding template antenna. The defined antenna characteristics can include some or all of a respective defined antenna height, antenna azimuth, antenna downtilt, antenna power, and antenna radiation model.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for automated sector creation, the system comprising:
a location mapper to assign a mapped licensed geographic region (mLGR) to each template deployment of a plurality of template deployments based on a template site defined by the template deployment to correspond to one of a plurality of cell sites in a target coverage area of a radiofrequency (RF) network to be deployed by a network operator for use of spectrum blocks licensed to the network operator under geographic spectrum licenses,
wherein each template deployment defines a set of template antennas at the template site, and the mLGR is one of a plurality of mLGRs that each defines a geographic region at least partially encompassing one or more licensing regions of the geographic spectrum licenses;
a spectrum mapper to assign, to each template deployment, at least one mapped spectrum block set (mSBS) based on the mLGR and the geographic spectrum licenses; and
a sector generator to compute, for each mSBS at each template deployment, a sector deployment that defines a set of sector antennas for installation at the template site defined by the template deployment, such that each of the set of sector antennas operates in accordance with the mSBS and with antenna characteristics of the template antennas defined by the template deployment.

2. The system of claim 1, further comprising:
a mapping database having, stored thereon, a plurality of mLGR definitions to define respective geographical boundaries for each mLGR,
wherein, for each template deployment, the location mapper is to assign the mLGR by locating the template site as within the respective geographical boundaries of an identified one of the plurality of mLGRs, and assigning the mLGR for the template deployment as the identified one of the plurality of mLGRs.

3. The system of claim 1, further comprising:
a mapping database having, stored thereon, a plurality of mappings that identify, based on the geographic spectrum licenses, which of the spectrum blocks is licensed to the network operator in each of the plurality of mLGRs,
wherein, for each template deployment, the spectrum mapper is to assign the at least one mSBS based on the plurality of mappings.

4. The system of claim 1, wherein:
the sector generator is to compute, for each mSBS at each template deployment, the sector deployment to define the set of sector antennas to have:
a first sector antenna defined to have an antenna height and a first antenna azimuth;
a second sector antenna defined to have the antenna height and a second antenna azimuth that is approximately 120 degrees removed from the first antenna azimuth; and
a third sector antenna defined to have the antenna height and a third antenna azimuth that is approximately 240 degrees removed from the first antenna azimuth.

5. The system of claim 1, wherein:
the one or more licensing regions includes at least two of: a Bureau of Economic Analysis Economic Area (BEA), a Partial Economic Area (PEA), a Cellular Market Area (CMA), or a Federal Communications Commission (FCC) United States County equivalent, or a Component Economic Area (CEA); and
the one or more licensing regions are mapped to the mLGRs, such that each template site has a physical location corresponding to only one of the mLGRs.

6. The system of claim 1, wherein each template deployment defines the antenna characteristics, such that each template antenna of the template antennas has a respective defined antenna height, antenna azimuth, antenna downtilt, antenna power, and antenna radiation model.

7. The system of claim 1, wherein each mSBS corresponds either to one of the spectrum blocks licensed to the network operator under geographic spectrum licenses, or to a contiguous subset of the spectrum blocks licensed to the network operator under geographic spectrum licenses.

8. The system of claim 1, wherein the plurality of template deployments is previously designed by the network operator to satisfy a link budget in the target coverage area.

9. A method for automated sector creation, the method comprising:
assigning a mapped licensed geographic region (mLGR) automatically to each template deployment of a plurality of template deployments based on a template site defined by the template deployment to correspond to one of a plurality of cell sites in a target coverage area of a radiofrequency (RF) network to be deployed by a network operator for use of spectrum blocks licensed to the network operator under geographic spectrum licenses,
wherein each template deployment defines a set of template antennas at the template site, and the mLGR is one of a plurality of mLGRs that each at least partially encompasses one or more licensing regions of the geographic spectrum licenses;
assigning, automatically to each template deployment, at least one mapped spectrum block set (mSBS) based on the mLGR and the geographic spectrum licenses; and
computing, automatically for each mSBS at each template deployment, a sector deployment that defines a set of sector antennas for installation at the template site defined by the template deployment, such that each of the set of sector antennas operates in accordance with the mSBS and with antenna characteristics of the template antennas defined by the template deployment.

10. The method of claim 9, further comprising:
generating the set of template deployments to satisfy a predetermined link budget in the target coverage area based on the plurality of available cell sites and a radiation propagation model of the target coverage area.

11. The method of claim 9, wherein:
each of the plurality of mLGRs is associated with one of a stored plurality of mLGR definitions that defines respective geographical boundaries for the mLGR; and
for each template deployment, the assigning the mLGR comprises locating the template site as within respective geographical boundaries of an identified one of the plurality of mLGRs, and assigning the mLGR for the template deployment as the identified one of the plurality of mLGRs.

12. The method of claim 9, wherein, for each template deployment, assigning the at least one mSBS is based on a plurality of mappings that identifies, based on the geographic spectrum licenses, which of the spectrum blocks is licensed to the network operator in each of the plurality of mLGRs.

13. The method of claim 9, wherein the computing the sector deployment for each mSBS at each template deployment comprises defining the set of sector antennas to have:
a first sector antenna defined to have an antenna height and a first antenna azimuth;
a second sector antenna defined to have the antenna height and a second antenna azimuth that is approximately 120 degrees removed from the first antenna azimuth; and
a third sector antenna defined to have the antenna height and a third antenna azimuth that is approximately 240 degrees removed from the first antenna azimuth.

14. The method of claim 9, wherein:
the one or more licensing regions includes at least two of: a Bureau of Economic Analysis Economic Area (BEA), a Partial Economic Area (PEA), a Cellular Market Area (CMA), or a Federal Communications Commission (FCC) United States County equivalent, or a Component Economic Area (CEA); and
the one or more licensing regions are mapped to the mLGRs, such that each template site has a physical location corresponding to only one of the mLGRs.

15. The method of claim 9, wherein each template deployment defines the antenna characteristics, such that each template antenna of the template antennas has a respective defined antenna height, antenna azimuth, antenna downtilt, antenna power, and antenna radiation model.

16. The method of claim 9, wherein each mSBS corresponds either to one of the spectrum blocks licensed to the network operator under geographic spectrum licenses, or to a contiguous subset of the spectrum blocks licensed to the network operator under geographic spectrum licenses.

17. A system for automated sector creation, the system comprising:
one or more processors; and
a non-transient memory having instructions stored thereon, which, when executed, cause the one or more processors to perform steps comprising:
assigning a mapped licensed geographic region (mLGR) to each template deployment of a plurality of template deployments based on a template site defined by the template deployment to correspond to one of a plurality of cell sites in a target coverage area of a radiofrequency (RF) network to be deployed by a network operator for use of spectrum blocks licensed to the network operator under geographic spectrum licenses,
wherein each template deployment defines a set of template antennas at the template site, and the mLGR is one of a plurality of mLGRs that each defines a geographic region at least partially encompassing one or more licensing regions of the geographic spectrum licenses;
assigning, to each template deployment, at least one mapped spectrum block set (mSBS) based on the mLGR and the geographic spectrum licenses; and
computing, for each mSBS at each template deployment, a sector deployment that defines a set of sector antennas for installation at the template site defined by the template deployment, such that each of the set of sector antennas operates in accordance with the mSBS and with antenna characteristics of the template antennas defined by the template deployment.

18. The system of claim 17, wherein:
the non-transient memory further has, stored thereon, a plurality of mLGR definitions to define respective geographical boundaries for each mLGR,
wherein, for each template deployment, the assigning the mLGR comprises locating the template site as within the respective geographical boundaries of an identified one of the plurality of mLGRs, and assigning the mLGR for the template deployment as the identified one of the plurality of mLGRs.

19. The system of claim 17, wherein:
the non-transient memory further has, stored thereon, a plurality of mappings that identify, based on the geographic spectrum licenses, which of the spectrum blocks is licensed to the network operator in each of the plurality of mLGRs,
wherein, for each template deployment, assign the at least one mSBS is based on the plurality of mappings.

20. The system of claim 17, wherein the computing the sector deployment for each mSBS at each template deployment comprises defining the set of sector antennas to have:
a first sector antenna defined to have an antenna height and a first antenna azimuth;
a second sector antenna defined to have the antenna height and a second antenna azimuth that is approximately 120 degrees removed from the first antenna azimuth; and
a third sector antenna defined to have the antenna height and a third antenna azimuth that is approximately 240 degrees removed from the first antenna azimuth.

* * * * *